(12) United States Patent
Murli et al.

(10) Patent No.: US 12,522,484 B2
(45) Date of Patent: Jan. 13, 2026

(54) MATERIAL HANDLING VEHICLE GUIDANCE SYSTEMS AND METHODS

(71) Applicant: The Raymond Corporation, Greene, NY (US)

(72) Inventors: Sathvik Murli, Green Brook, NJ (US); Anthony V. D'Accolti, Manlius, NY (US); Joel N. Sunny, Mineola, NY (US)

(73) Assignee: The Raymond Corporation, Greene, NY (US)

( * ) Notice: Subject to any disclaimer, the term of this patent is extended or adjusted under 35 U.S.C. 154(b) by 182 days.

(21) Appl. No.: 18/076,191

(22) Filed: Dec. 6, 2022

(65) Prior Publication Data

US 2023/0174358 A1     Jun. 8, 2023

Related U.S. Application Data

(60) Provisional application No. 63/286,909, filed on Dec. 7, 2021.

(51) Int. Cl.
*B66F 9/06*     (2006.01)
*G05D 1/00*     (2024.01)

(52) U.S. Cl.
CPC ........... *B66F 9/063* (2013.01); *G05D 1/0238* (2013.01)

(58) Field of Classification Search
CPC ...... B66F 9/063; G05D 1/0238; G05D 1/024; G01S 17/42; G01S 17/87; G01S 17/93

(Continued)

(56) References Cited

U.S. PATENT DOCUMENTS

| 5,999,865 A | 12/1999 | Bloomquist et al. |
| 6,608,913 B1 | 8/2003 | Hinton et al. |

(Continued)

FOREIGN PATENT DOCUMENTS

EP     2715286 B1     11/2020

OTHER PUBLICATIONS

Raymond, Raymond intelliguide™ Wire Guidance System, Retrieved from https://www.raymondcorp.com/campaign/intelliguide-wire-guidance, Accessed on May 27, 2021, 6 pages.

(Continued)

*Primary Examiner* — Krishnan Ramesh
(74) *Attorney, Agent, or Firm* — Quarles & Brady LLP

(57) ABSTRACT

Guidance systems and methods for a material handling vehicle are provided. A guidance system can include a sensor and a processor unit. The sensor can be configured to measure a distance to an external object within a field of view of the sensor and output distance information corresponding to the measured distance. The processor can be configured to receive the distance information from the sensor, transform the distance information from a sensor coordinate system to a material handling vehicle coordinate system, perform pattern recognition on the transformed distance information to identify an aisle feature, create an aisle model based on the identified aisle feature, and determine a guidance instruction for the material handling vehicle based on the aisle model. The aisle model can include information corresponding to the aisle feature. The guidance instruction may be configured to align the material handling vehicle within an aisle.

15 Claims, 11 Drawing Sheets

(58) Field of Classification Search
USPC .......................................................... 701/26
See application file for complete search history.

(56) References Cited

U.S. PATENT DOCUMENTS

| | | | |
|---|---|---|---|
| 8,090,491 B2 | 1/2012 | Barfoot et al. | |
| 8,463,437 B2 | 6/2013 | Ohno | |
| 9,046,893 B2* | 6/2015 | Douglas | G05D 1/024 |
| 10,442,465 B2 | 10/2019 | Dhome et al. | |
| 11,367,043 B2 | 6/2022 | Jacobus et al. | |
| 11,412,157 B1* | 8/2022 | Slavin | G06V 20/52 |
| 2012/0078471 A1* | 3/2012 | Siefring | B66F 9/0755 |
| | | | 701/41 |
| 2013/0054129 A1* | 2/2013 | Wong | B66F 9/063 |
| | | | 702/150 |
| 2014/0058612 A1 | 2/2014 | Wong et al. | |
| 2014/0058634 A1* | 2/2014 | Wong | G01S 17/08 |
| | | | 701/50 |
| 2014/0247279 A1* | 9/2014 | Nicholas | G06F 3/011 |
| | | | 345/633 |
| 2017/0121158 A1* | 5/2017 | Wong | G07C 5/08 |
| 2021/0035056 A1 | 2/2021 | Jacobus et al. | |
| 2021/0035057 A1 | 2/2021 | Jacobus et al. | |
| 2021/0049543 A1 | 2/2021 | Jacobus et al. | |
| 2021/0056499 A1 | 2/2021 | Jacobus et al. | |
| 2021/0197858 A1* | 7/2021 | Zhang | G08G 1/161 |
| 2021/0316975 A1* | 10/2021 | Yeo | G01S 17/42 |
| 2021/0326800 A1 | 10/2021 | Jacobus et al. | |
| 2021/0374659 A1* | 12/2021 | Ganapathi | B65G 1/1371 |
| 2022/0044430 A1* | 2/2022 | Eckman | G01S 7/4817 |
| 2022/0187841 A1* | 6/2022 | Ebrahimi Afrouzi | |
| | | | G05D 1/0242 |
| 2022/0250887 A1 | 8/2022 | Hämmerl | |
| 2022/0272303 A1* | 8/2022 | Kurniawan | G06T 7/70 |
| 2022/0341786 A1* | 10/2022 | Yamaguchi | G01S 17/48 |
| 2023/0005374 A1* | 1/2023 | Elimaleh | G08G 1/065 |

OTHER PUBLICATIONS

European Patent Office, Extended European Search Report, Application No. 22211803.6, Mar. 31, 2023, 11 pages.

* cited by examiner

MATERIAL HANDLING VEHICLE GUIDANCE SYSTEMS AND METHODS

CROSS-REFERENCE TO RELATED APPLICATION

This application is based on, claims priority to, and incorporates herein by reference in its entirety U.S. Provisional Patent Application No. 63/286,909 filed Dec. 7, 2021, and entitled "Material Handling Vehicle Guidance Systems and Methods."

BACKGROUND

Guidance systems for material handling vehicles can be used to guide a material handling vehicle within an operating environment (e.g., a warehouse) and, in particular, along an aisle formed between storage racking (e.g., pallet racking). Such conventional guidance systems generally include external infrastructure to operate.

For example, a guidance system for a material handling vehicle may utilize a wire installed along the middle of an aisle, which generates a frequency that can be detected by the material handling vehicle. The material handling vehicle can include an antenna that can detect the wire and a processor to analyze the signals from the antenna. Using the signals generated by the antenna, the processor can determine a distance between the material handling vehicle and the wire and can accordingly determine how to control steering so as to align (i.e., center) the material handling vehicle over the wire. However, such external infrastructure is expensive and cumbersome to implement, and the guidance systems will only work in areas of the operating environment where such external infrastructure has been implemented.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

BRIEF SUMMARY

The present disclosure relates generally to materially handling vehicles, and, more specifically, to material handling vehicle guidance within an operating environment.

According to some aspects of the present disclosure, a guidance system for a material handling vehicle is provided. The system can include a sensor configured to measure a distance to an external object within a field of view of the sensor and output distance information corresponding to the measured distance, and a processor unit in communication with the sensor and configured to receive the distance information from the sensor, transform the distance information from a sensor coordinate system to a material handling vehicle coordinate system, perform pattern recognition on the transformed distance information to identify an aisle feature, create an aisle model based on the identified aisle feature, and determine a guidance instruction for the material handling vehicle based on the aisle model.

According to some aspects of the present disclosure, a material handling vehicle is provided. The material handling vehicle can include a vehicle management system configured to control the movement of the material handling vehicle, a sensor configured to measure a plurality of distances, wherein each distance is a distance to one of a plurality of external objects, and output a distance information corresponding to the plurality of measured distances, and a processor unit in communication with the sensor and the vehicle management system, the processor unit being configured to receive the distance information from the sensor, transform the distance information from a sensor coordinate system to a material handling vehicle coordinate system, identify an aisle feature based on the transformed distance information, create an aisle model based on the identified aisle feature, determine a guidance instruction based on the aisle model, and provide the guidance instruction to the vehicle management system.

According to some aspects of the present disclosure, a guidance method for a material handling vehicle is provided. The method can include measuring, with a sensor, a plurality of distances, wherein each distance is a distance to one of a plurality of external objects, and, using a processor unit in communication with the sensor: transforming the plurality of distance measurements from a sensor coordinate system to a material handling vehicle coordinate system, performing pattern recognition on the plurality of transformed distance measurements to identify an aisle feature, creating an aisle model based on the identified aisle feature, determining a guidance instruction for the material handling vehicle based on the aisle model, and providing the guidance instruction to the material handling vehicle.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
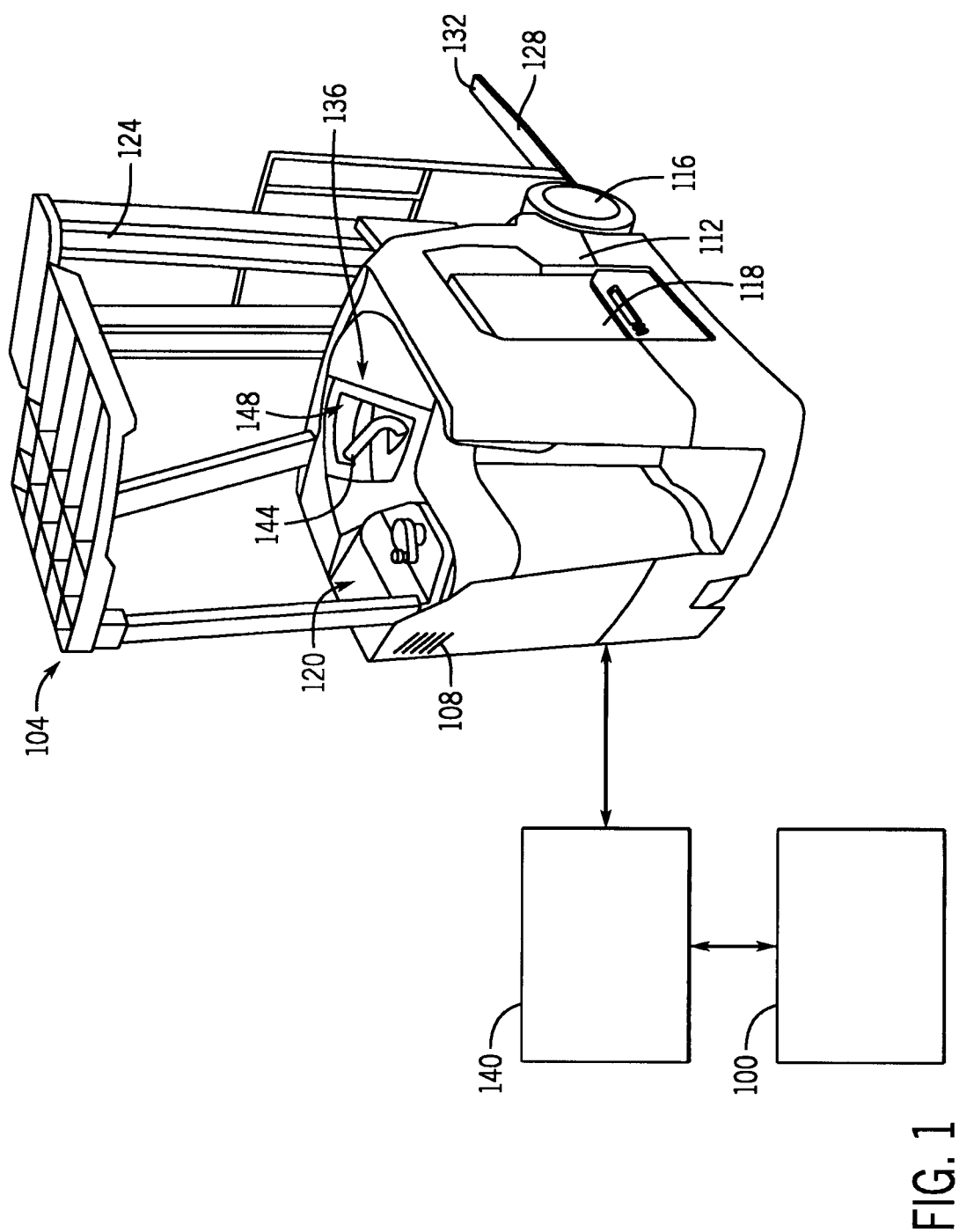
FIG. 1 is a perspective view of a material handling vehicle, according to various aspects of the present disclosure.

Before any aspects of the present disclosure are explained in detail, it is to be understood that the present disclosure is not limited in its application to the details of construction and the arrangement of components set forth in the following description or illustrated in the following drawings. The invention is capable of other non-limiting examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," and the like, is meant to indicate A, or B, or C, or any combination of A, B, and/or C. Unless specified or limited otherwise, the terms "mounted," "secured," "connected," "supported," and "coupled" and variations thereof are used broadly and encompass both direct and indirect mountings, connections, supports, and couplings. Further, "connected" and "coupled" are not restricted to physical or mechanical connections or couplings.

It is also to be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is also to be appreciated that material handling vehicles (MHVs) are designed in a variety of classes and configurations to perform a variety of tasks. It will be apparent to those of skill in the art that the present disclosure is not limited to any specific MHV, and can also be provided with various other types of MHV classes and configurations, including for example, lift trucks, forklift trucks, reach trucks, SWING REACH® vehicles, turret trucks, side loader trucks, counterbalanced lift trucks, pallet stacker trucks, order pickers, transtackers, tow tractors, and man-up trucks, and can be commonly found in warehouses, factories, shipping yards, and, generally, wherever pallets, large packages, or loads of goods can be required to be transported from place to place. The various systems and methods disclosed herein are suitable for any of operator controlled, pedestrian controlled, remotely controlled, and autonomously controlled material handling vehicles. Further, the various system and methods disclosed herein are suitable for other vehicles, such as automobiles, busses, trains, tractor-trailers, farm vehicles, factory vehicles, and the like.

Advantageously, a guidance system for a MHV according to the present disclosure may operate without external infrastructure (e.g., without wire guidance and the associated components thereof), and can automatically detect and adjust the guidance of the MHV based on the width and/or positions of the one or more sides of the aisle (in either case, whether fixed or variable along the length of the aisle) without requiring any predetermined map of the aisle or its features. Storage racking can be used to store a wide variety of objects, some of which may have a depth that is larger than a corresponding depth of a storage rack. Consequently, objects may sometimes protrude beyond the storage rack into the aisle.

A guidance system according to the present disclosure may be field installed onto existing MHV's to increase functionality and operational efficiency. Such guidance systems may be implemented (e.g., interface and/or run concurrently) with other types of automation systems. For example, a guidance system according to the present disclosure may also be used for/with two-way traffic control in order to guide multiple MHV's in wide aisle to stay on the correct side of the aisle, may interface with an obstacle avoidance system, and the like.

In some non-limiting examples, a guidance system according to the present disclosure can accommodate for variability in an effective width of an aisle and the relative location of an effective centerline of the aisle. The guidance system can include a sensor unit and a processor unit that can be configured to guide a MHV along an aisle formed between storage racking. The guidance system may be configured to detect and identify between storage racking and objects being stored on the storage racking, as well as controlling a steering angle of the MHV as the MHV moves along the aisle. In some embodiments, the guidance system may also be configured to control the speed and/or braking of the MHV.

FIG. 1 illustrates a non-limiting example of a MHV 104, which can be an automated guided vehicle (AGV), such as a fully- or semi-autonomous AGV, or a manually-operated vehicle. The MHV 104 may comprise a guidance system 100. The MHV 104 may be configured as a manually operable MHV that can include a vehicle frame 108, a power section 112, a traction wheel 116, and an operator compartment 120. The power section 112 can be disposed within the vehicle frame 108 and may include a power source, for example, a battery 118 configured to supply power to various components of the MHV 104. The battery 118 can supply power to a motor (not shown) and/or transmission (not shown) disposed within the power section 112, which can be configured to drive the traction wheel 116. In other non-limiting examples, the MHV 104 can include other types of power sources, for example, an engine.

In the illustrated non-limiting example, the traction wheel 116 may be configured as a pair of traction wheels (only one shown) arranged under the power section 112, which can be configured to work together to propel the MHV 104 and to control a direction of travel (e.g., a steering angle) of the MHV 104. In other non-limiting examples, the traction wheel 116 can be arranged in another location under the vehicle frame 108. In some non-limiting examples, the traction wheel 116 may include only one wheel or more than two wheels and the functions of propelling the MHV 104 and controlling a direction of travel may be carried out by separate wheels.

In some embodiments, the MHV 104 can include a mast 124 for raising and lowering a fork assembly 128 (or, in other non-limiting examples, a platform, an operator cabin, or other implement assemblies). The mast 124 may be in the form of a telescoping mast with the fork assembly 128 attached thereto such that the fork assembly 128 can be selectively raised and lowered by the mast 124. The fork assembly 128 may include one or more forks 132 that can engage a load, for example, a pallet. In the illustrated non-limiting example, the fork assembly 128 can include a pair of forks 132. In some non-limiting examples, the fork assembly 128 can be coupled to the mast 124 by a reach actuator.

The operator compartment 120 can include a control interface 136 that can be configured to control one or more functions of the MHV 104. For example, the control interface 136 can be communicatively coupled with a vehicle management system (VMS) 140 via wired or wireless communication (e.g., via a Controller Area Network (CAN bus)) that can be configured to control the various functions of the MHV 104. In some embodiments, the VMS 140 may be internal to the MHV 104. In some embodiments, the VMS 140 may be external to the MHV 104, for example in communication with the MHV 104 via wired or wireless communication. The guidance system 100 may be configured to communicatively couple with the VMS 140, for example using wired or wireless communication.

In some embodiments, the control interface 136 can include a control handle 144 configured to allow the operator to control a speed and direction of travel of the MHV 104. Alternatively or additionally, the control interface 136 can include a display 148 (e.g., a touch-controlled display) that can be configured to allow the operator to control the operation of the MHV 104 and/or to provide the operator with visual and/or audible feedback. In some embodiments, the control interface 136 may be configured to allow the operator to engage and/or disengage the guidance system 100. In some non-limiting examples, the control interface 136 can include various types of input devices (e.g., joysticks, steering wheels, push-buttons, etc.) and feedback devices (e.g., lights, screens, haptic feedback systems, speakers, etc.) for controlling the MHV 104.

Figure 2:
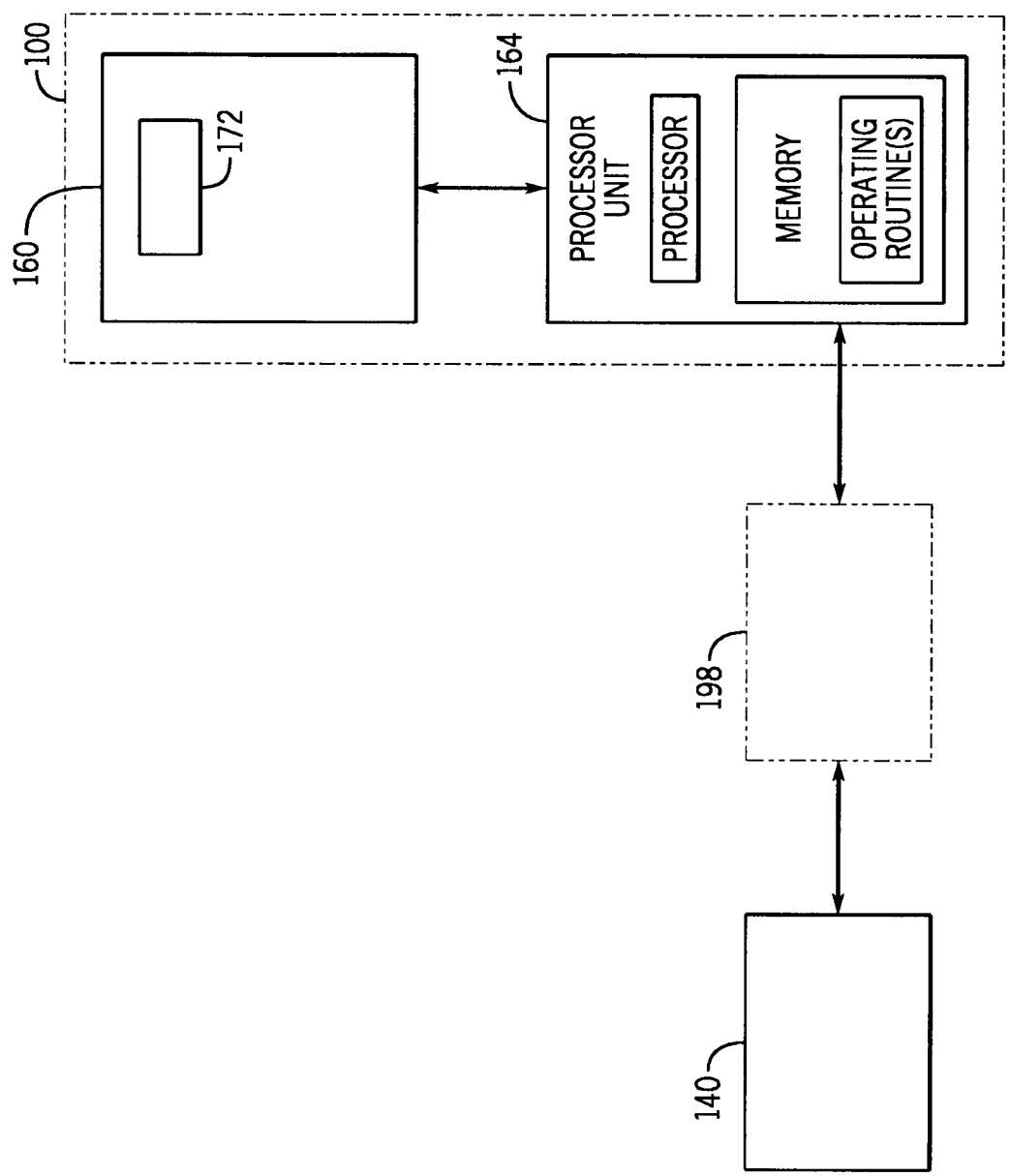
FIG. 2 is a schematic illustration of an exemplary guidance system for a material handling vehicle, according to various aspects of the present disclosure.

FIG. 2 illustrates a non-limiting example of a guidance system 100 configured to guide a MHV 104 along an aisle. In some embodiments, the guidance system 100 may comprise a processor unit 164 and a sensor unit 160. The sensor unit 160 may be communicatively coupled with the processor unit 164, for example via a CAN Bus, Ethernet, wireless communication link, or the like. As will be described in greater detail below, the sensor unit 160 and the processor unit 164 can work together to detect and identify (e.g., classify) storage racking, objects being stored therein, and/or walls, and to provide input to the vehicle management system 140 to control, for example, a steering angle of the MHV 104 as it travels along an aisle.

Various components of the guidance system 100 may be implemented on one or more processor units 164. The processor unit 164 may be configured to send and/or receive information (e.g., including instructions, data, values, signals, or the like) to/from the various components of the guidance system 100 and/or external components such as the VMS 140. The processor unit 164 may comprise, for example, a processor, DSP, CPU, APU, GPU, microcontroller, application-specific integrated circuit, programmable gate array, and the like, any other digital and/or analog components, as well as combinations of the foregoing (whether distributed, networked, locally connected, or the like), and may further comprise inputs and outputs for receiving and providing control instructions, control signals, drive signals, power signals, sensor signals (e.g., current or voltage sensor output, image sensor output, volumetric scanner output, and the like), digital signals, analog signals, and the like. All such computing devices and environments are intended to fall within the meaning of the terms "controller," "control unit," "processor," "processor unit," "processing device," or "processing circuitry" as used herein unless a different meaning is explicitly provided or otherwise clear from the context. In some examples, the processor unit 164 may comprise one or more such processor devices.

The processor unit 164 may comprise processing circuitry configured to execute operating routine(s) stored in a memory. The memory may include any suitable volatile memory, non-volatile memory, storage, any other suitable type of storage medium, or any suitable combination thereof. For example, the memory may include RAM, ROM, EEPROM, one or more flash drives, one or more hard disks, one or more solid state drives, one or more optical drives, etc. In some embodiments, the memory may have encoded thereon a computer program for controlling operation of the processor unit 164, VMS 140, sensor unit 160, or the like. In some embodiments, the various components of the guidance system 100 may be implemented entirely as software, entirely as hardware, or any suitable combination thereof. In some embodiments, the operating routine(s) may comprise firmware.

In some embodiments, the guidance system 100 may be communicatively coupled (e.g., via the processor unit 164) with the VMS 140, either directly or indirectly. In some embodiments, the VMS 140 may comprise the processor unit 164, for example sharing a processing device to implement the guidance system 100 as well as perform other vehicle management functions. In some embodiments, the guidance system 100 may be coupled to the VMS 140 via an arbitrator module 198. As will be described in more detail below, the arbitrator module may facilitate communication between multiple systems and the VMS 140.

The sensor unit 160 can include one or more sensors 172 that can be configured to detect objects in the surrounding environment, in particular, storage racking, objects being stored in the storage racking, walls, and the like. In some embodiments, the sensor 172 may comprise a volumetric sensor 172, for example a three-dimensional LiDAR sensor. In some embodiments, the sensor 172 may comprise a three-dimensional depth camera. In some embodiments, the sensor unit 160 may comprise a single sensor 172 configured to monitor multiple sides of the MHV 104 simultaneously (e.g., the area to the left and right of the MHV 104 are within a field of view of the sensor 172). In some embodiments, the sensor unit 160 may include two or more sensors 172, each of which may be configured to monitor a section of the environment surrounding the MHV 104. For example, in some embodiments, the sensor unit 160 may comprise two sensors 172, each configured to monitor an area to a particular side of the MHV 104 (e.g., opposing left and right sides of an aisle). The field of view of multiple sensors 172 may be combined to form a field of view of the guidance system 100. In other non-limiting examples, other types of sensors as known in the art can also be used, for example, RADAR, image sensors (e.g., RGB, RGB-D, etc.), stereo cameras, time of flight sensors, ultrasonic sensors, or the like. In yet other non-limiting examples, two-dimensional sensors can alternatively or additionally be used.

Figure 3:
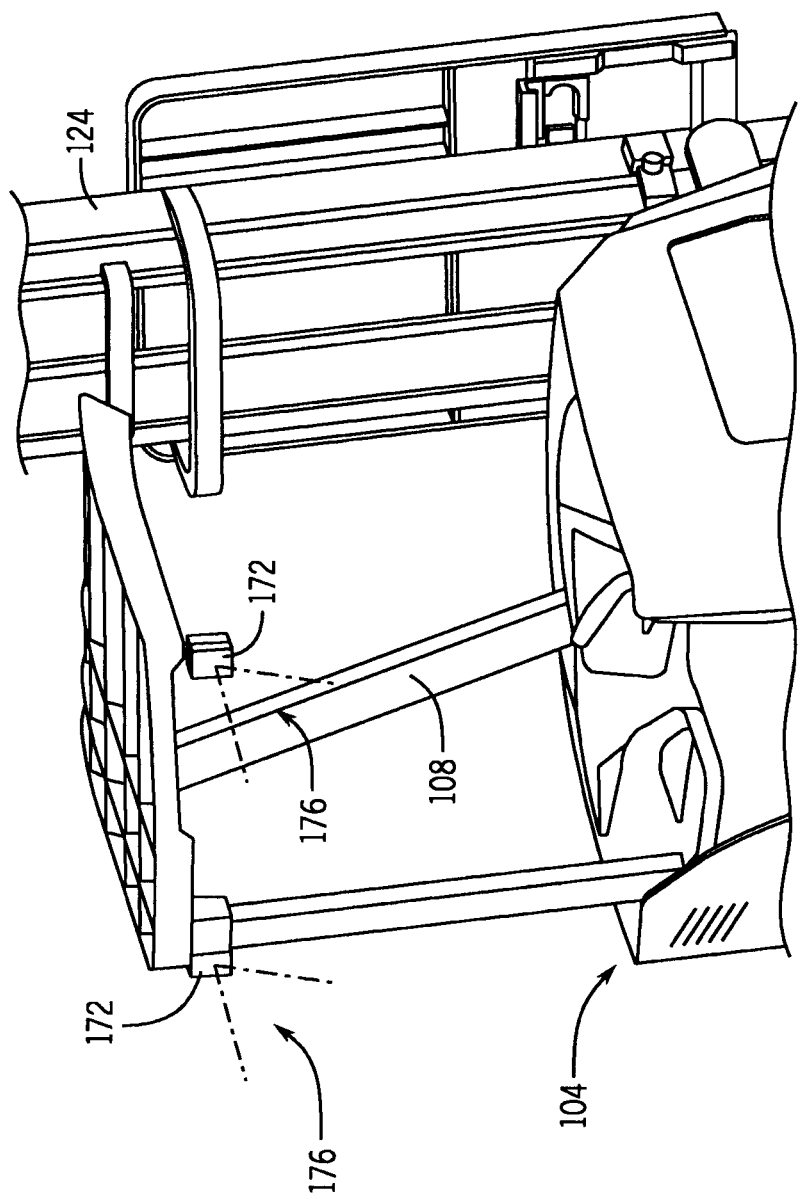
FIG. 3 is a perspective view of sensors placed about a material handling vehicle, according to various aspects of the present disclosure.

The sensor unit 160 and/or sensors 172 may be configured to be installed on the MHV 104. For example, the sensor unit 160 may be installed onto an upper portion of the vehicle frame 108. In other non-limiting examples, the sensor unit 160 can be installed in different configurations. For example, as shown in FIG. 3, the sensors 172 can be installed at an elevated location on the MHV 104, such as an upper portion of the frame 108, so as to have a field of view 176 that is not impeded or minimally impeded by the mast 124 or other portions of the MHV 104. In this way, the sensor unit 160 can have a minimally inhibited or completely uninhibited field of view 176 around the MHV 104, so as to allow the guidance system 100 to align the MHV 104 within an aisle in one or both of a frame-first direction, where the MHV 104 enters the aisle in a reverse direction so that the vehicle frame 108 enters the aisle before the fork assembly 128, and a forks-first direction, where the MHV 104 enters the aisle in a forward direction so that the fork assembly 128 enters the aisle before the vehicle frame 108. The sensor unit 160 can also be installed on an exterior of the MHV 104 and in some embodiments may include a cover. In some embodiments, the specific mounting configuration may vary depending on operational factors, including but not limited to the type of MHV and the conditions of the operating environment.

The guidance system 100 may be configured to determine the position of external objects within a field of view of the sensor 172 and provide guidance instructions to the MHV 104 according to a determined distance from such objects. In some embodiments, the sensor 172 can detect the relative position of storage racking, objects stored in the storage racking, walls, rails, and other objects that can define an aisle along which the MHV 104 can travel. Determining the position of external objects such as storage racking, walls, etc., may include classifying detected objects as a specific type of object, for example, classifying a detected object as storage racking or a crossbeam. The sensor 172 can be used for both aligning the MHV 104 with an aisle (i.e., prior to entering the aisle) and for keeping the MHV 104 centered or otherwise aligned within the aisle as it moves along the aisle.

Figure 4:
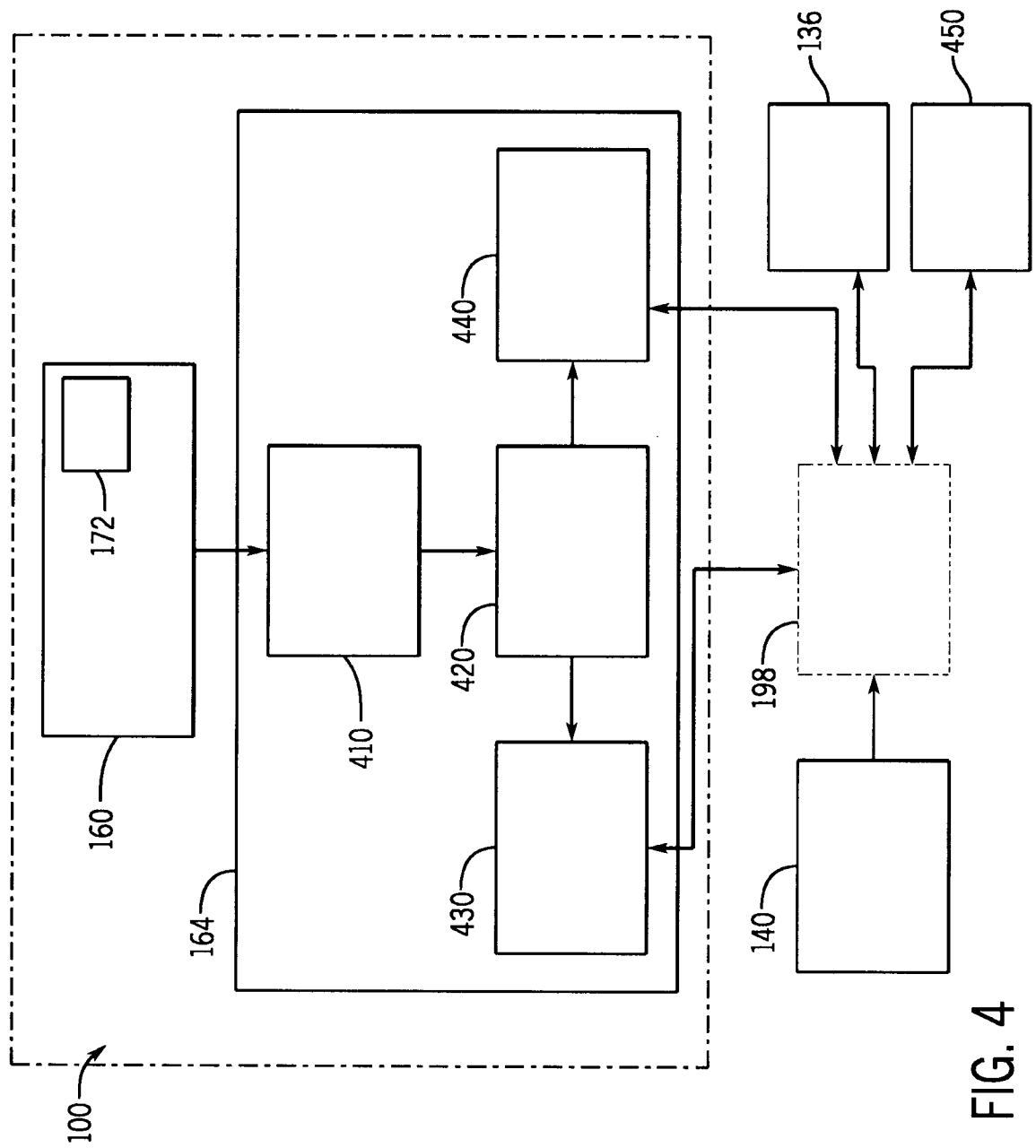
FIG. 4 is a schematic illustration of an exemplary guidance system in communication with a machine handling vehicle system, according to various aspects of the present disclosure.

Referring to FIG. 4, in some embodiments the processor unit 164 can be configured as an on-board processor unit that can operate without external infrastructure. That is, the processor unit 164 can be installed on the MHV 104 and can be configured to locally process and otherwise analyze the sensor output from the sensor unit 160. In some embodiments, the processor unit 164 can include various modules implemented as processes, for example implemented as firmware, subroutines, or the like. In some embodiments, the modules may comprise a communication application programming interface (API) 410, a pre-processing module 420, a post-processing module 440, and a guidance module 430, that can work together to analyze the sensor output, determine distance, and output instructions for navigating (i.e., guiding) the MHV 104.

In some embodiments, the pre-processing module 420 may be configured to perform pre-processing functions, for example data manipulations on the raw sensor output (i.e., raw data from sensor 172) or a point cloud directly before a lane centering method or other post-processing methods are applied. For example, pre-processing functions can include filtering data returns (e.g., median filter), coordinate transformations of the sensor data cloud points from Polar coordinates to Cartesian coordinates, or another type of coordinate system, and/or stitching data returns from multiple sensors into a single point cloud and/or frame of view.

In some embodiments, the post-processing module 440 may be configured to perform post-processing functions, for example software modules unrelated to in-aisle guidance and centering software. For example, in some embodiments the sensor data can be used for object avoidance in addition to being used for in-aisle guidance and centering functions. In some embodiments, the guidance module 430 may be configured to calculate a travel path of the MHV 104 and any associated instructions to be carried out by the VMS 140 to allow the MHV 104 to travel along said path.

With the aisle identified, for example the walls and/or storage racking that defines the sides of aisle (as described in more detail below), the guidance system 100 (e.g., the processor unit 164, or more specifically the guidance module 430) can then control the direction of travel of the MHV 104 to keep the MHV 104 centered between the respective sides of the aisle. In some embodiments, the guidance system 100 may communicate with the vehicle management system 140 (e.g., via a CAN bus) to control the steering angle of the traction wheel 116. For example, the processor unit 164 may perform a heading angle calculation, where the processor unit 164 can detect a current heading angle of the MHV 104 with respect to the aisle to determine whether a steering angle adjustment is desired for the MHV 104 to become or stay aligned within the aisle. The heading angle calculation may account for various factors such as a steering angle, speed, and type of the MHV 104.

If the guidance system 100 determines that a steering angle adjustment is desired, the processor unit 164 may calculate the desired steering angle adjustment. The guidance system 100 can then send a corresponding command to the VMS 140 to adjust the steering angle of the traction wheel 116 accordingly. In some embodiments, the heading angle calculation may result in a function of time, for example various steering angles for the MHV 104 to execute over a period of time, and the guidance system 100 may send a respective series of commands to the VMS 140. In some non-limiting examples, the guidance system 100 may determine whether a change in speed is desired, for example, when the MHV 104 reaches the end of an aisle and can also command the VMS 140 to accelerate or decelerate the MHV 104 (e.g., by controlling a motor and/or a braking system).

In some non-limiting examples, the guidance system 100 may be configured to communicate directly with the vehicle management system 140. Alternatively, the guidance system 100 may be configured to communicate indirectly with the vehicle management system 140. In some embodiments, the commands from the guidance system 100 (e.g., from processor unit 164) may first be received by, for example, an arbitrator module 198 that may also receive commands from other modules, such as an autonomous operation module 450 that comprises one or more semi-autonomous or fully autonomous modules. The arbitrator module 198 may determine which commands are to be carried out by the vehicle management system 140 to control the MHV 104.

For example, if the autonomous operation module 450 sends a command to adjust the steering angle to a value, and the guidance system 100 sends a command to adjust the steering angle to the same value as the other module has set, the arbitrator module 198 can allow both commands to pass through to the VMS 140. However, if both the autonomous operation module 450 and the guidance system send conflicting commands to adjust the steering angle to differing values, the arbitrator module 198 may only allow the command from either the guidance system 100 or the autonomous operation module 450 to pass through to the VMS 140.

The guidance system 100 may be configured to maintain a minimum buffer distance between one or more sides of the aisle and the MHV 104. The minimum buffer distance can be set by an operator or a warehouse management system to account for variability in operating environments. For example, some warehouses may store oversized items that can protrude beyond a front face of the storage racking and into the aisle. Additionally, if the aisle is a double-wide aisle that is configured to allow two-way travel, the guidance system 100 can be configured to maintain the buffer on only a single side of the aisle, for example by using a centering offset, thereby allowing two-way travel to be maintained. In some embodiments, the guidance system 100 can be configured to maintain the MHV 104 at the minimum buffer distance from the side of the aisle, for example along whichever side of the aisle the MHV 104 enters along.

Accordingly, if the guidance system 100 determines that the minimum buffer distance has not been maintained, the guidance system 100 can instruct the MHV 104 to re-establish the minimum buffer distance. In some embodiments, if the minimum buffer distance cannot be maintained, the guidance system 100 can relinquish control back to the operator, in turn, providing a corresponding indication (e.g., an audible or visual indication via the control interface 136) to the operator that the guidance system is no longer operating. If the guidance system 100 determines that the MHV 104 is not aligned in the aisle (e.g., centered or maintaining a minimum buffer distance), the operator may regain full control of the MHV 104.

Figure 5B:
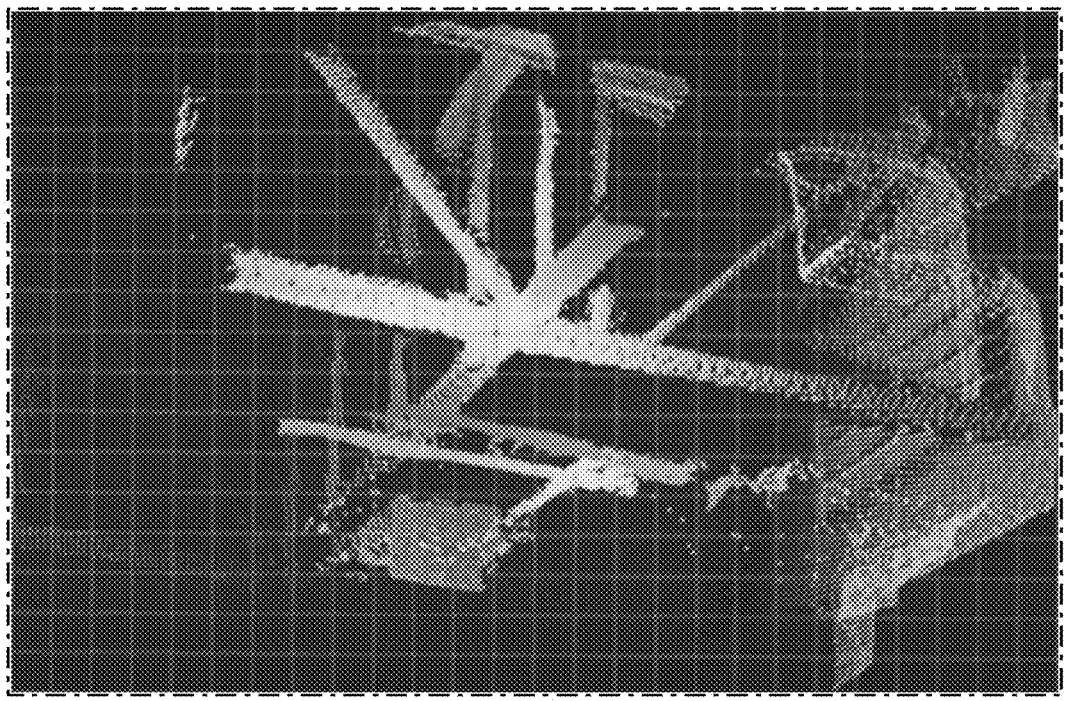
FIG. 5B is an illustration of a point cloud output by a LiDAR sensor, according to various aspects of the present disclosure.
Figure 5A:
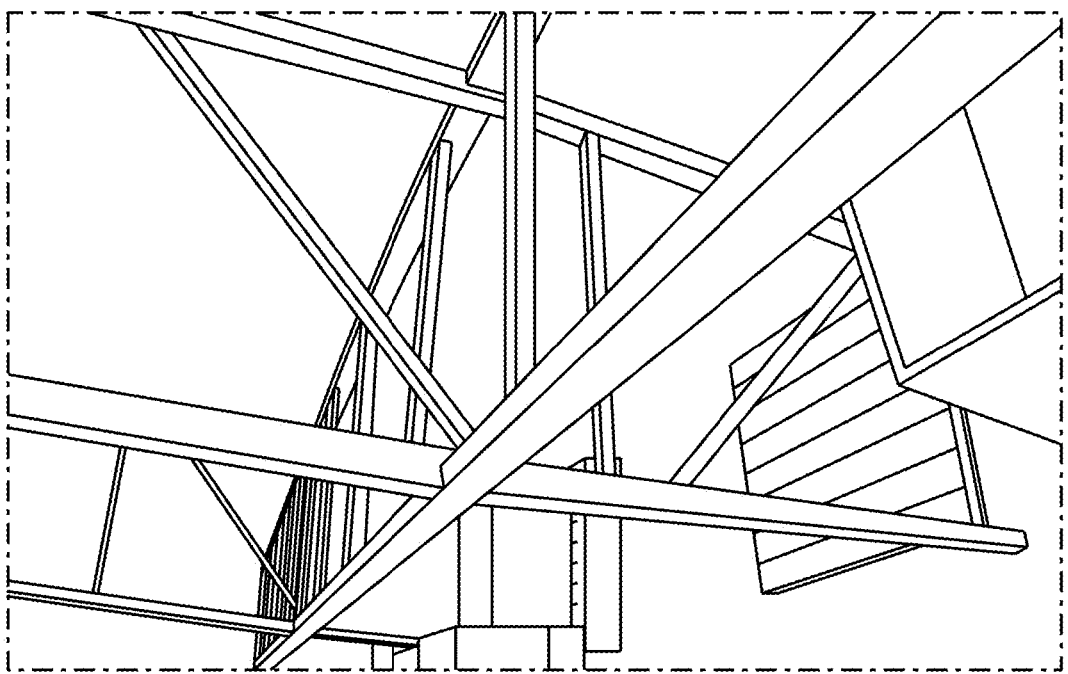
FIG. 5A is an illustration of an operating environment having a pallet rack, according to various aspects of the present disclosure.

Referring to FIGS. 5A and 5B, the sensor 172 may generate sensor output comprising information relating to the sensed environment. The sensor output may comprise two-dimensional (2D) or three-dimensional (3D) information, for example, such as a point cloud indicating the position of various detected points in 3D-space relative to the sensor 172. For example, FIG. 5A representatively illustrates an environment comprising the side of an aisle having racking and various objects stored therein, from the perspective of a sensor 172 mounted to a MHV 104, and FIG. 5B illustrates a 3D point cloud of the detected environment as generated by a LiDAR sensor, color coded based on distance from the sensor. In many applications, the sensor will be oriented at an incident angle with respect to some of the environment.

Figure 5C:
FIG. 5C is an illustration of a transformed LiDAR point cloud, according to various aspects of the present disclosure.

In some embodiments, the guidance system 100, for example using the processor unit 164, may transform the sensor output from the coordinate system of the sensor 172 to a coordinate system of or related to the MHV 104 (which may be referred to herein as a "spatial transform"). For example, the sensor position (x, y, z) and orientation (pitch, roll, yaw) with respect to a predetermined reference point of the MHV 104 may be used to perform a three-dimensional transform of the sensor output. In some embodiments, the sensor output may be transformed to the reference frame of the MHV 104 (e.g., oriented with respect to a predetermined reference point and coordinate system of the MHV 104). In some embodiments, the sensor output may be transformed with respect to a two-dimensional (2D) reference plane aligned parallel with a respective side of the MHV 104. For example, FIG. 5C illustrates a 3D LiDAR point cloud transformed to a coordinate system of the MHV 104, with the points color coded based on distance perpendicular to the MHV 104 (or, in some embodiments, based on distance into the racking).

Figure 6A:
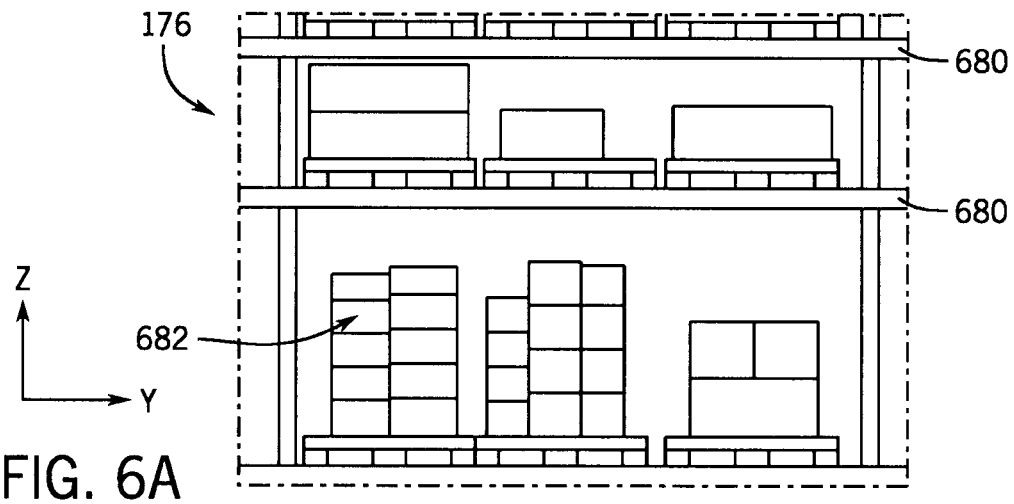
FIG. 6A is an illustration representing a transformed sensor output, according to various aspects of the present disclosure.

In some embodiments, the guidance system 100 may organize the transformed sensor output into a grid along the Y-Z plane, and each grid may be evaluated to provide a depth measurement along the X-axis. The depth of each grid may be determined by factors such as a heatmap or density of measurement data and may be influenced by the resolution of a given sensor. For example, with additional reference to FIG. 6A, a field of view (or partial field of view) 176 of the sensor 172 transformed to a plane parallel to the side of the MHV 104 (i.e., a left or right side that generally faces the side of the aisle) is illustrated. The field of view 176 of the sensor 172 is of a non-limiting example of a storage rack 680 configured as a pallet rack, with a plurality of objects 682 being stored in the storage rack 680 on pallets. The transformed sensor output indicates the distance of each point with respect to the side of the MHV 104, with respect to a plane passing through the predetermined MHV 104 reference point and parallel with the side of the MHV 104, with respect to a plane passing through the inferred or calculated path of travel of the MHV 104, or the like.

Figure 6B:
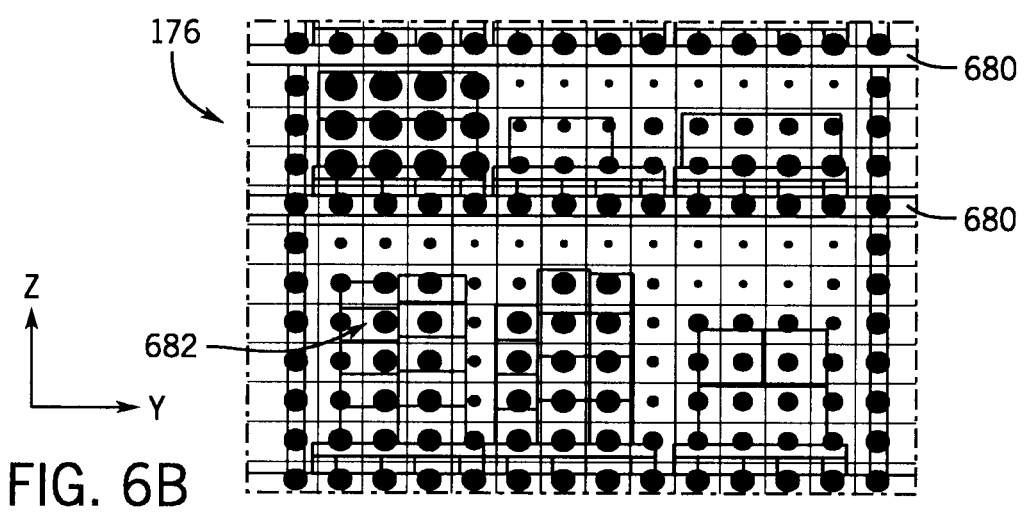
FIG. 6B is an illustration of the transformed sensor output with grid analysis, according to various aspects of the present disclosure.

Referring to FIG. 6B, the distances of the objects (relative or absolute) in the transformed field of view 176 to the respective reference frame are representatively illustrated by circles overlaid on a spatial grid, with larger circles indicating objects that are closer to the respective reference frame (e.g., closer to the respective coordinate system origin or reference plane) and smaller circles indicating objects that are located further from the respective reference frame. The spatial grid and circles shown in FIG. 6B are shown for illustrative purposes and the distance data measured by the sensor 172 can be configured differently. The processor unit 164 may be configured to store and execute one or more algorithms for processing the transformed sensor output from the sensor 172. In some embodiments, the guidance system 100 may be configured to perform occupancy grid analysis using the transformed sensor output.

In general, the guidance system 100 may be configured (e.g., via one or more operating routines stored in the processor unit 164 memory) to carry out one or more methods (e.g., pattern recognition algorithms, machine learning models, or the like) on the transformed sensor output to differentiate between and/or identify crossbeams of the storage racking, uprights of the storage racking, the objects being stored in the storage racking, walls, and the like. In some embodiments, the guidance system 100 may be configured to detect and identify storage racking (e.g., storage rack 680) using distance changes along a height of the field of view 176 (i.e., a Z-axis oriented in a vertical direction with respect to FIG. 6C) and/or changes along a width of the field of view 176 (i.e., a Y-axis oriented in a horizontal direction with respect to FIG. 6C), to identify which objects in the field of view 176 are likely to be storage racking or a wall. It will be recognized that any suitable pattern matching or other algorithms may be used to identify various aisle features according to a sensor type, for example object classification using RGB gradients, reflectivity values from LiDAR, machine learning models for various types of sensor data, and the like.

Figure 6C:
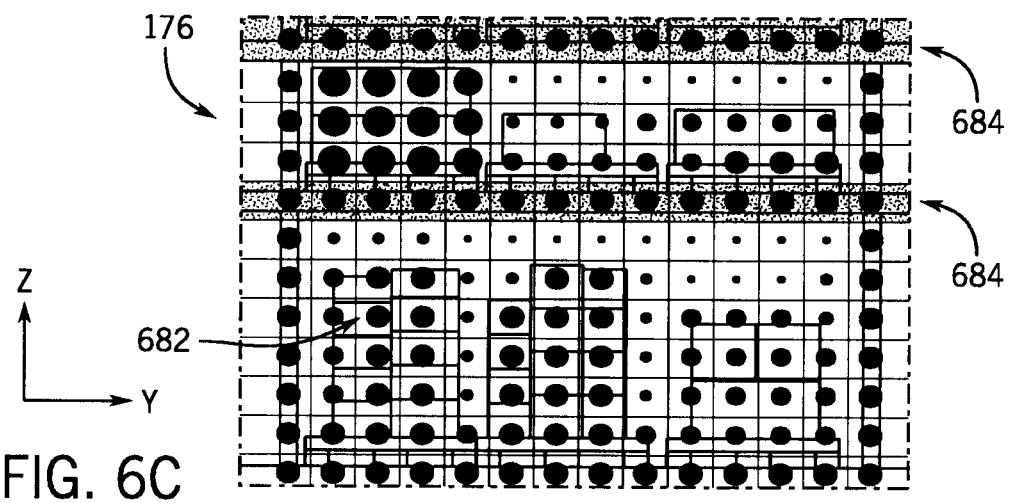
FIG. 6C is an illustration of the transformed sensor output with pattern recognition, according to various aspects of the present disclosure.

Referring to FIG. 6C, in some embodiments, the guidance system 100 may be configured to identify crossbeams in the transformed sensor output using pattern recognition. For example, the guidance system 100 may be configured to identify a pattern along the Y-axis that indicates a horizontal crossbeam. In some embodiments, the pattern recognition may comprise determining a depth gradient approaching zero (e.g., consistent depth in the X-axis direction) along the Y-axis at a certain Z-height (e.g., the Z-coordinate of the respective grids along the Y-axis). If pattern recognition identifies one or more crossbeams, then the guidance system 100 may then determine the respective Z-height(s) to be region(s) of interest 684. In some embodiments, the guidance system 100 may be similarly configured to identify vertical crossbeams. It will be recognized that other pattern recognition may be used.

Figure 7:
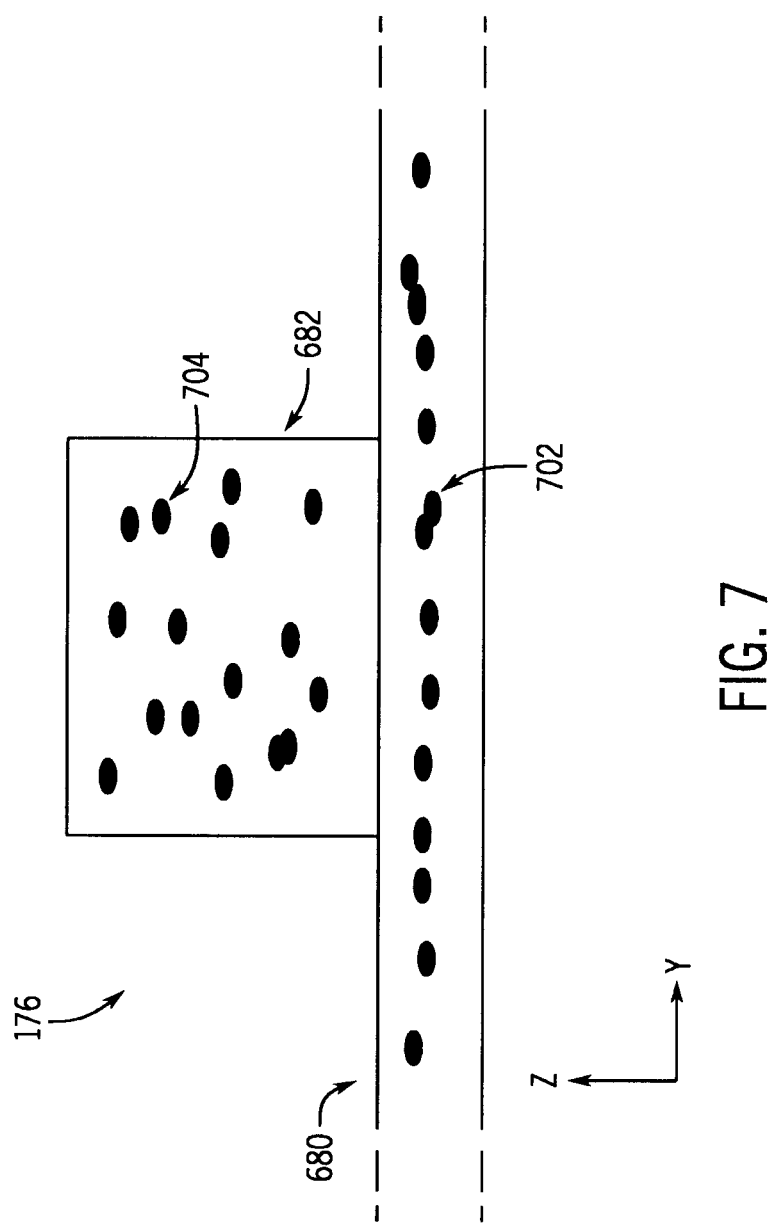
FIG. 7 is an illustration representing a density of sensor output of different features, according to various aspects of the present disclosure.

Referring to FIG. 7, in some embodiments, the guidance system 100 may be configured to determine whether there are a predefined number and/or density of data points disposed along a certain length of the field of view 176 (e.g., along a Y-axis that is oriented in a horizontal direction with respect to FIG. 7). As illustrated in FIG. 7, a lower plurality of data points 702 has at least a predefined number and/or density of individual points extending along a predefined width of the field of view 176 so that the guidance system 100 can classify the lower plurality of data points as belonging to a crossbeam. Conversely, an upper plurality of data points 704, for example representing an object 682 on the storage rack 680, has fewer than the predefined number of individual points extending along the width of the field of view 176. The guidance system 100 can classify the upper plurality of data points 704 as not belonging to a crossbeam. It is appreciated that the number of predefined data points in the above determinations can vary depending on the specific application. For example, a guidance system 100 with sensor unit 160 having a comparatively low resolution may utilize a smaller number of data points than a guidance system 100 with sensor unit 160 having a comparatively high resolution.

In some embodiments, the guidance system 100 may be configured to differentiate between storage racking and walls by identifying data points that are likely to be associated with crossbeams (e.g., cross-members) for storage racking by determining whether there are a predefined number and/or density of data points disposed within a certain height of one another, a predetermined depth gradient, or the like. For example, walls generally have heights that are larger than a corresponding height of a crossbeam. Accordingly, if the pattern recognition determines that a plurality of points is generally in-line with one another and extend along a predefined height of the field of view 176, the points are likely to belong to a wall and not a cross-beam. Where a wall is found, the guidance system 100 may select a portion of the wall to be treated as a crossbeam of a storage rack. For example, in some embodiments, the guidance system 100 may determine that a wall is present to a side of the MHV 104 by determining that depth gradients approach zero at a large number of Z-heights, in which case the guidance system 100 may pick one or more such Z-heights as representing one or more proxy crossbeams. For example, the guidance system 100 may select one or more Z-heights where the wall would be expected to be continuous along its length, such as where windows, doors, or the like are not expected to exist. This may be parameterized and set on a case-by-case basis.

In some embodiments, it may be desirable to repeatedly determine the distance of the MHV 104 from one or more sides of the aisle as the MHV 104 moves along the aisle. For example, in some embodiments, the guidance system 100 may determine the distance of a reference frame (e.g., a plane passing through the predetermined MHV 104 reference point and parallel with a respective side of the MHV 104) from the one or more determined objects (e.g., a crossbeam) as the MHV 104 moves along the aisle. In some embodiments, the guidance system 100 may determine the distance from the one or more determined objects multiple times a second, for example from about 10 times a second to about 30 times a second, 50 times a second, 100 times a second, and the like. The frequency of distance determination may depend on performance requirements of the system, such as speed of the MHV 104, width of the aisle, sensor 172 output capabilities, likelihood of obstacles, and the like.

Each new distance determination may require a new sensor output transform, as described above. In some embodiments, the sensor output may comprise a 3D point cloud (e.g., from a LiDAR sensor) having hundreds of thousands of points for each LiDAR scan. Transforming and/or performing feature identification (e.g., pattern matching) using all of the sensor data for each scan, such as all the points in the point cloud, may be compute intensive and may result in a lower rate of coordinate transform and/or feature identification and thus a lower rate of distance determination and guidance updates.

Figure 8:
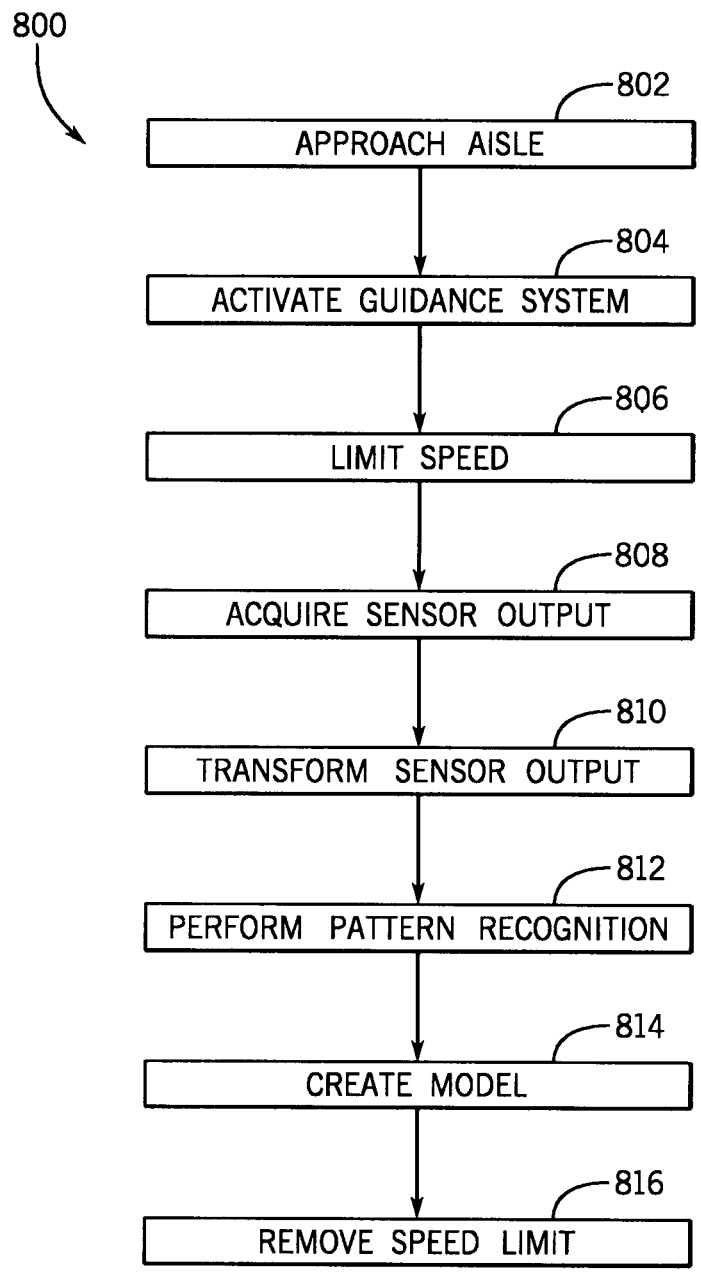
FIG. 8 is a flowchart of an aisle induction method, according to various aspects of the present disclosure.

Referring to FIG. 8, a non-limiting of example of a method 800 for initiating a guidance system (also referred to as "aisle induction") is illustrated. The aisle induction method 800 may be implemented as one or more operating routines stored in the memory of the processor unit 164. At step 802, an operator can control the MHV 104 to approach an aisle, for example by aligning the MHV 104 generally along the direction of travel along the aisle. In some embodiments, to facilitate the guidance system 100 identifying an aisle and/or aisle feature, the operator may maneuver the MHV 104 to be within a certain proximity to a side of an aisle and/or to be at an angle with respect to the aisle that is less than a predetermined angle limit (e.g., to be substantially aligned with the direction of the aisle, within some allowed angle range).

At step 804, the guidance system 100 can be activated (i.e., turned on) by an operator via the control interface 136, for example, by touching a virtual button on the display 148. In other non-limiting examples, guidance system 100 can be activated 804 in different ways, such as the guidance system 100 being configured to automatically detect an aisle nearby. Until the guidance system 100 is activated, the operator may have full control over both the speed and the direction of travel (i.e., steering) of the MHV 104. In some embodiments, once the guidance system 100 has been activated at step 804, the speed of the MHV 104 can be limited by the guidance system 100 at step 806 to provide additional time for the identification of the aisle (e.g., crossbeam positions) by the guidance system 100. In some embodiments, the steering behavior may be limited at step 806.

The guidance system 100 may acquire sensor output from the sensor unit 160 at step 808, and transform the sensor output at step 810, as described above. In some embodiments, the guidance system 100 may transform all sensor output, substantially all of the sensor output, a subset of the sensor output (e.g., excluding a predetermined peripheral area of the sensor), or the like. Sensor output from a plurality of sensors 172 may be transformed to a uniform reference coordinate system (e.g., an MHV reference frame), individual reference frames for each sensor 172 (e.g., reference frames oriented on the left side and right side of the MHV 104), or any other suitable reference frame(s) from which the guidance system 100 can determine the absolute or relative location of one or more aisle features with respect to the MHV 104. As used herein, an aisle feature may comprise a crossbeam, proxy crossbeam, wall, railing, or other regular feature that may define an aisle, and from which the relative and/or absolute position of the MHV 104 within the aisle may be determined.

At step 812, the guidance system 100 may perform pattern recognition on the transformed sensor output, for example as described above, to identify one or more aisle features. In some embodiments, the guidance system 100 may identify and discard sensor output representing the floor. If an aisle feature is identified, then the guidance system 100 may, at step 814, create a virtual (i.e., software-based) model of the aisle (herein referred to as an "aisle model"). In some embodiments, the aisle model may be stored in the memory of the processor unit 164. The aisle model may comprise information corresponding to the aisle feature. The modeled aisle feature may be referred to herein as a "projected reference." The aisle model may comprise information such as the type of aisle feature (horizontal crossbeam, vertical crossbeam, proxy crossbeam, etc.) being modeled, the number of projected references, the location along the Y-axis or Z-axis of each projected reference (e.g., height of a projected reference representing a horizontal crossbeam), start position of each projected reference, slope of each projected reference, figure of merit of each projected reference and/or the model, confidence interval of each projected reference and/or the model, or the like.

Because aisle features may be somewhat regular or continuous, the projected reference may be configured to project (predict) the position of the features further into the aisle beyond the field of view 176 of the sensor unit 160. In some embodiments, the projected reference information may be stored with respect to the transformed reference frame (e.g., the reference frame of the MHV 104), may be stored with respect to the reference frame of the sensor, or both.

In some embodiments, the guidance system 100 may determine whether the aisle (e.g., using the model or actual measurements from the sensor output) is too wide or too narrow. For example, in some non-limiting examples, use of the guidance system 100 can be limited to specific operating scenarios, such as in aisles having a width that is less than a maximum permitted width or greater than a minimum permitted width. The maximum and/or minimum width of an aisle in which the guidance system 100 is permitted to operate can be set by an operator or warehouse management system and may correspond with, for example, a width of a single-wide aisle, a double-wide aisle, width of the MHV 104, or the like.

In some embodiments, if an aisle feature is identified and an aisle model is successfully created, the guidance system 100 may, at step 816, remove the speed limit of step 806 or otherwise relinquish control of the speed of the MHV 104 to the operator, AGV (e.g., via an autonomous operation module 450), warehouse management system, or the like. As the operator continues moving the MHV 104 toward or into the aisle, the guidance system 100 can then navigate the MHV 104 within the aisle, for example centering the MHV 104 approximately equidistant from each of the respective sides of the aisle, aligning the MHV 104 offset from the center of the aisle by a predefined distance, aligning the MHV 104 at a minimum, or an offset from the minimum, distance (e.g., a buffer distance) from a side of the aisle, or the like. In some embodiments, the operator may control the speed of the MHV 104 while the guidance system 100 aligns the MHV 104 within the aisle.

Figure 9:
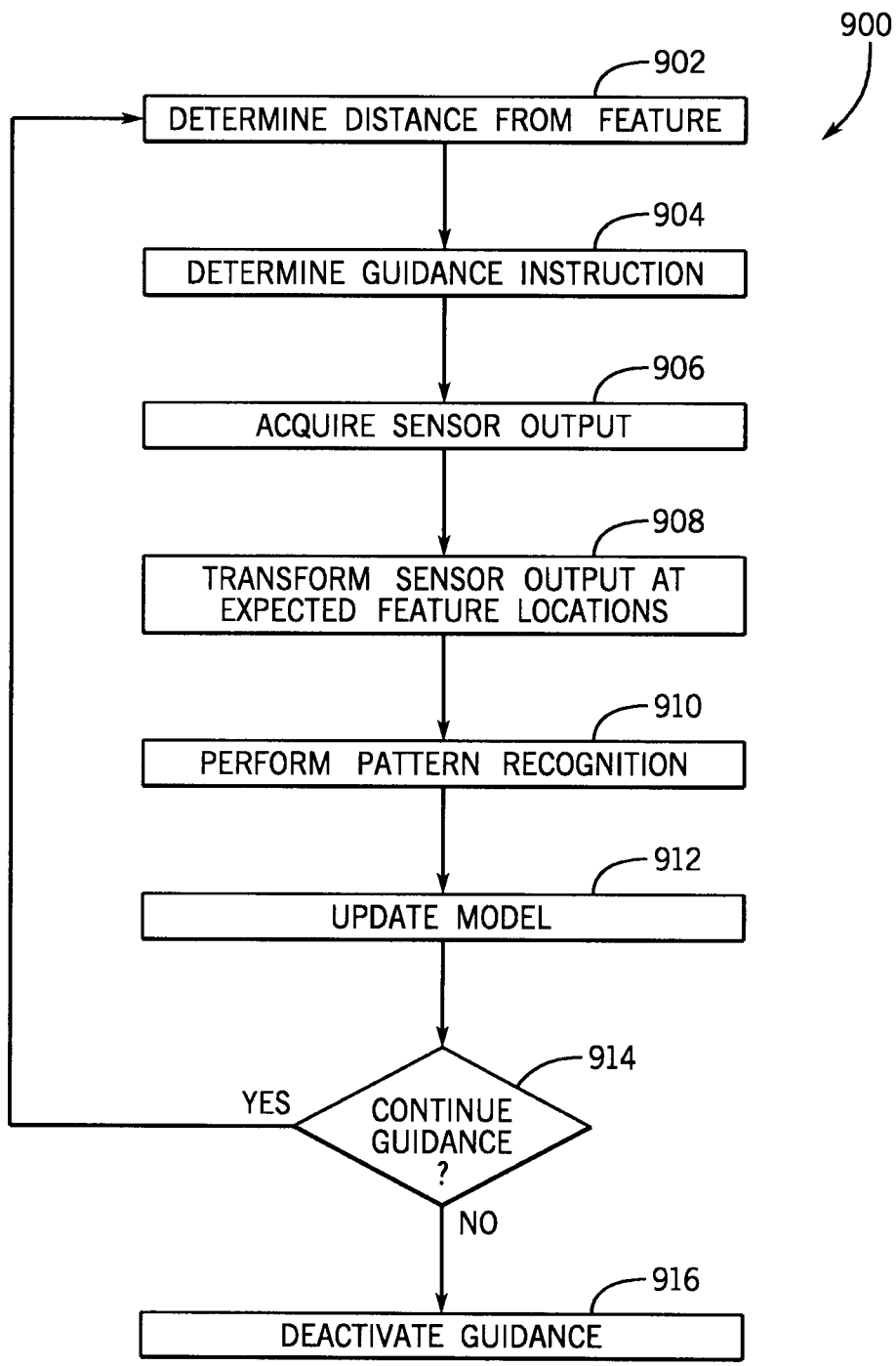
FIG. 9 is a flowchart of an aisle navigation method, according to various aspects of the present disclosure.

For example, referring to FIG. 9, a non-limiting of example of a method 900 for aisle navigation is illustrated. The aisle navigation method 900 may be implemented as one or more operating routines stored in the memory of the processor unit 164. At step 902, the guidance system 100 may determine the distance of the MHV 104 from one or more aisle features using the aisle model. The guidance system 100 may determine the distance (relative or absolute) from the aisle feature to MHV 104 based on the information stored in the aisle model, for example by determining the horizontal distance (e.g., perpendicular to the MHV 104) of the projected reference to the relevant reference frame of the MHV 104. In some embodiments, the guidance system 100 may determine the distance of the left and/or right side of the MHV 104 from aisle features on the left and/or right side of the MHV 104, using respective projected reference information from the aisle model. In some embodiments, the guidance system 100 may determine the distance of the center of the MHV 104 from aisle features on the left and/or right side of the MHV 104, using respective projected reference information from the aisle model. In some embodiments, the guidance system 100 may determine the heading angle of the MHV 104 with respect to the one or more projected references or may receive heading information from the VMS 140.

At step 904, the guidance system 100 may perform path planning to determine a guidance instruction. The guidance instruction may comprise one or more instructions to guide the MHV 104 onto the desired travel path (e.g., desired position with respect to the aisle features) through the aisle. A guidance instruction may comprise any suitable command that is usable by the MHV 104 to control its location in the environment. In some embodiments, the guidance system 100 may perform path planning based on the determined distance(s) and/or angle(s) from step 902, in combination with the desired position of the MHV 104 with respect to the projected references (centered, offset, minimum distance from edge, etc.). In some embodiments, a guidance instruction may comprise a steering angle, steering direction, speed, target coordinates, amount to shift left or right, or the like. In some embodiments, the guidance instruction may comprise a steering angle limit to limit how much steering may be applied, for example if the MHV 104 is on or almost on the desired travel path. In some embodiments, the guidance system 100 may send the guidance instruction to the MHV 104, for example to the VMS 140.

Figure 10:
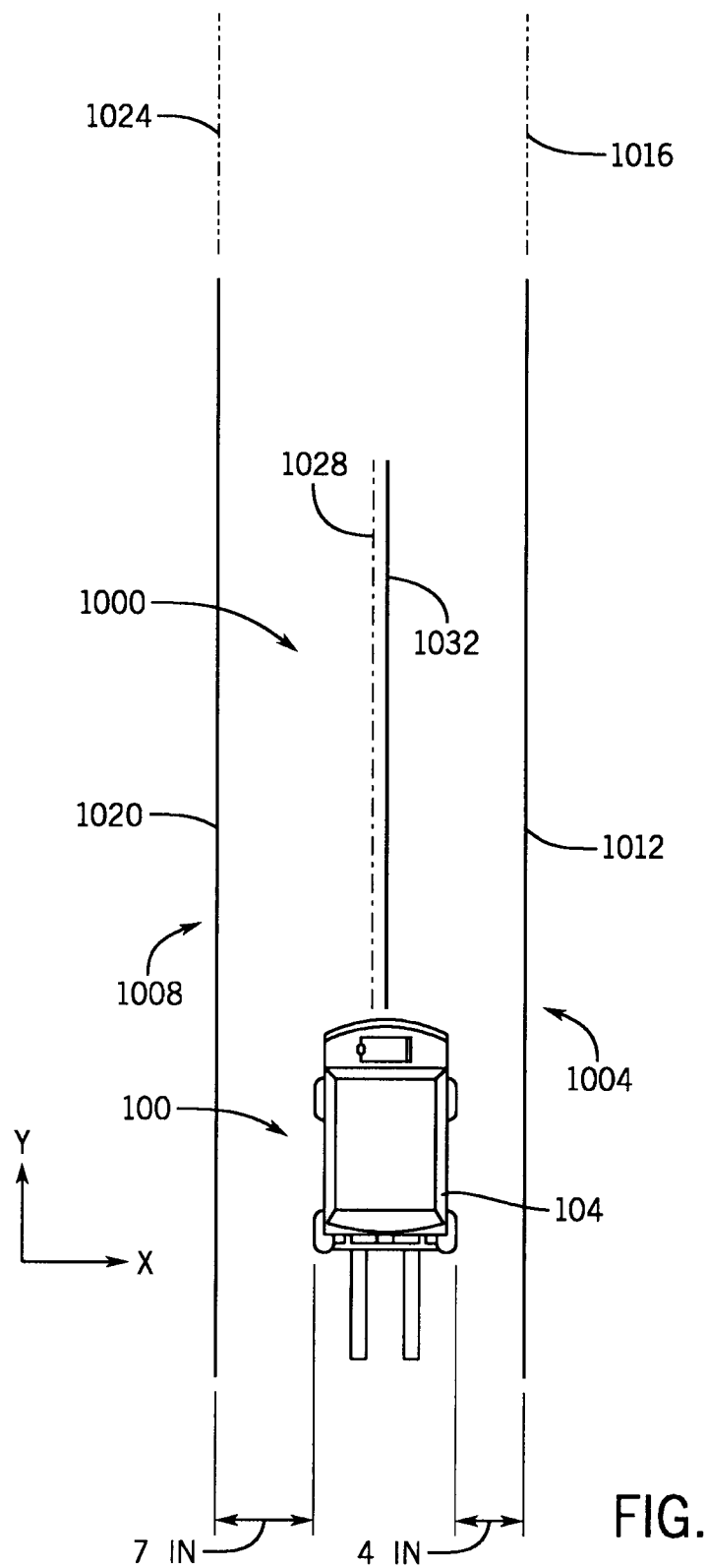
FIG. 10 is a schematic illustration of a material handling vehicle using a guidance system to travel along an aisle.

For example, with additional reference to FIG. 10, the MHV 104 is shown moving along an aisle 1000 having a first side 1004 (e.g., right side) opposite a second side 1008 (e.g., left side). As illustrated, each of the first side 1004 and the second side 1008 of the aisle are formed from storage racking. The first side 1004 is formed from a first actual crossbeam 1012 and the second side 1008 is formed from a second actual crossbeam 1020. Accordingly, from the view of the aisle model, the first side 1004 is defined by a first projected reference 1016 (i.e., projected crossbeam) and the second side 1008 is defined by a second projected reference 1024 (i.e., a projected crossbeam). Not illustrated is that the projected references 1016, 1024 extend over the indicated actual crossbeams 1012, 1020. In some embodiments, the guidance system 100 may use the positions of the projected references 1016, 1024 of the aisle 1000 to determine (step 904) a centerline 1028 of the aisle 1000 (e.g. a desired travel path) that is disposed between the projected references 1016, 2014. Likewise, the guidance system 100 can determine a current path of travel 1032 or static location of the MHV 104 (step 904), for example based on the current angle of the MHV 104 with respect to the projected references 1016, 1024 and the position of the MHV 104 along the X-axis between the projected references 1016, 1024.

In the illustrated example of FIG. 10, the path of travel 1032 of the MHV 104 is not aligned (i.e., coincident) with the centerline 1028 of the aisle 1000, the MHV 104 being four inches from the right projected reference 1016 and seven inches from the left projected reference 1024. The guidance system 100 can calculate a guidance instruction to cause the path of travel 1032 of the MHV 104 to become aligned with the centerline 1028 of the aisle 1000 as the MHV 104 continues to move along the aisle 1000. In another non-limiting example, when the aisle 1000 is wide enough to allow for two-way traffic, the guidance system may also be configured to perform a centering offset calculation. The centering offset calculation allows the desired path travel path (e.g. centerline 1028) to be offset closer to one side of the aisle 1000 as compared to the other side of the aisle 1000. In this way, the guidance system 100 can allow for two-way traffic. While the centerline 1028 of the aisle 1000 is shown being a straight line, this may not always be the case. For example, the aisle 1000 may be curved, and as described in more detail below, the guidance system may continually update the aisle model, including projected reference information, such that the MHV 104 may be appropriately guided through the aisle.

In some embodiments, the guidance system may continually or otherwise repeatedly acquire new sensor output. Referring again to FIG. 9, the guidance system 100 may acquire new sensor output at step 906, similar to or the same as in step 808 of the aisle induction method 800. It will be understood that the sensor output may be acquired 906 in any suitable order or timing with respect to the other steps of the navigation method 900.

Referring back to FIG. 9, in a first set of embodiments, at step 908, the guidance system 100 may transform a limited subset of the sensor output acquired in step 906 to the appropriate reference frame (e.g., a MHV reference frame), wherein the subset is based on the projected reference information in the aisle model. Following that, at step 910, the guidance system 100 may perform pattern recognition on the transformed subset of sensor output, for example pattern recognition similar to step 812 of the aisle induction method 800, to identify one or more aisle features. In some embodiments, the subset of sensor output transformed 908 corresponds to the expected location(s) of one or more aisle features as identified by the projected references.

In a second set of embodiments, at step 908, the guidance system 100 may transform the sensor output acquired in step 906 to the appropriate reference frame (e.g., a MHV reference frame), similar to or the same as step 810 of the aisle induction method 800. The sensor output transformed may be irrespective of the expected location(s) of one or more aisle features. Following that, at step 910, the guidance system 100 may perform pattern recognition on a subset of the transformed sensor output to identify one or more aisle features, wherein the subset is based on the projected reference information in the aisle model. In some embodiments, the subset of transformed sensor output corresponds to the expected location(s) of one or more aisle features as identified by the projected reference.

In some cases, the subset of sensor output transformed in the first set of embodiments, or the subset of transformed sensor output from which aisle features are identified in the second set of embodiments, may also include sensor output (or transformed sensor output, respectively) within a tolerance of the expected location(s) of the aisle features as identified by the projected references. For example, the subset operated upon may also include a predetermined height above and below the expected location of a horizontal crossbeam. The tolerance may provide for detecting unexpected changes, such as a change in the position of the respective aisle feature and may contribute to the confidence of the model by confirming that no aisle features exist outside of the expected regions. Advantageously, processing requirements are reduced compared to transforming and/or performing feature identification on the entire sensor output, allowing for faster updates and more responsive guidance.

In some embodiments, based on the results of pattern recognition 910, the guidance system 100 may update the aisle model at step 912. In some embodiments, the guidance system 100 may update the projected reference information based on the results of pattern recognition 910. The update of the projected reference information may be done through one or more filtering methods, such as moving average or median, weighted average or median, Kalman filter, or the like. It will be understood that acquiring sensor output 906, transforming sensor output 908, identifying an aisle feature 910, and updating the model 912 may be done at a different frequency from determining distance from an aisle feature 902 and determining a guidance instruction 904.

In some embodiments, the guidance system 100 may, at step 914, determine whether to continue providing guidance to the MHV 104. If the guidance system 100 determines to continue guidance, it may proceed to step 902 to determine a new distance from an aisle feature and continue to provide guidance accordingly. If the guidance system 100 determines to discontinue providing guidance, the guidance system 100 may stop the aisle navigation method 900 (i.e., deactivate guidance at step 916). In some embodiments, the guidance system 100 may, at step 916, be configured to first perform a portion of the aisle induction method 800 (e.g., steps 806 to 816) to attempt to reidentify the aisle feature(s). If the aisle induction method 800 is successful then the guidance system 100 may continue with the aisle navigation method 900, otherwise it may continue to deactivate guidance 916.

For example, at step 914 the guidance system 100 may be configured to determine whether the MHV 104 is nearing or is at the end of the aisle using the acquired sensor output from step 906, the transformed sensor output from step 908, or the result of the pattern recognition at step 910. If the guidance system 100 determines that the MHV 104 is not near an end of the aisle, the guidance system 100 can proceed back to step 902 as described above. If the guidance system 100 determines that the MHV 104 is nearing or is at the end of the aisle, the guidance system 100 may deactivate guidance 916. In some embodiments, the deactivating guidance 916 may comprise initiating an end of aisle procedure, for example slowing the MHV 104 and/or giving full control of the MHV 104 back to the operator. Additionally, the guidance system 100 may turn off or go into a standby mode until reactivated (e.g., at step 804 of the aisle induction method 800).

In another exemplary embodiment, the guidance system 100 may be configured to determine, at step 914 and based on the result of pattern recognition 910 or model update 912, that the model no longer accurately represents the aisle features and may be configured to accordingly deactivate guidance at step 916. For example, the guidance system 100 may determine that a confidence interval, figure of merit, or other measure of model reliability has fallen outside of an acceptable range, which may for example happen if there is an abrupt change in a number of aisle features.

Thus, according to the systems and methods described above, the guidance system 100 may first initialize (800) based on measured values of aisle features, but as the MHV 104 travels along aisle the guidance system 100 guides (900) the MHV 104 based on expected (predicted) locations of aisle references (i.e., the projected references in the aisle model). Advantageously, the guidance system 100 operating on the aisle model can prevent errant measurements, protrusions, or the like from throwing the MHV 104 off course or otherwise upsetting navigation. In some cases, protrusions into the aisle may exist (e.g., a pallet sticking out from racking). In some embodiments, the protrusion may be handled by the autonomous operation module 450 which may turn off guidance or otherwise take control of MHV 104 in appropriate circumstances.

Further, even though aisle features such as crossbeams may not run an entire length of an aisle, the guidance system 100 can continue to operate on the expected (predicted) locations of aisle features by way of the projected references in the aisle model and may continue to successfully navigate the aisle as the aisle model is updated with new or updated projected references. Accordingly, operating on projected references "smooths out" responses to unexpected or unideal situations such as an object overlaying (hiding) racking, a protruding object, gaps in the aisle feature, and the like.

In some embodiments, the guidance system 100 may temporarily store the aisle model as it navigates an aisle but may not permanently store the aisle model. In other words, the guidance system 100 may create a new aisle model (800) each time it begins traversing a given aisle, even if it has traversed the aisle previously. The guidance system 100 may accordingly be flexible to handle changes in an aisle without prior training or mapping of the aisle.

In addition, for certain types of vehicles there are training requirements imposed by various government agencies, laws, rules and regulations. For example, OSHA imposes a duty on employers to train and supervise operators of various types of material handling vehicles. Recertification every three years is also required. In certain instances, refresher training in relevant topics shall be provided to the operator when required. In all instances, the operator remains in control of the material handling vehicle during performance of any actions. Further, a warehouse manager remains in control of the fleet of material handling vehicles within the warehouse environment. The training of operators and supervision to be provided by warehouse managers requires among other things proper operational practices including among other things that an operator remain in control of the material handling vehicle, pay attention to the operating environment, and always look in the direction of travel.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the disclosed technology described herein.

Thus, while the disclosed technology has been described in connection with particular embodiments and examples, the disclosed technology is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the disclosed technology are set forth in the following claims.

We claim:

1. A guidance system for a material handling vehicle, comprising:
    a sensor configured to:
        measure a distance to an external object within a field of view of the sensor, the external object being an aisle feature within an aisle, the aisle formed by spaced structural features and forming a passage for the material handling vehicle, wherein the aisle feature is static; and
        output a distance information corresponding to the measured distance; and
    a processor unit in communication with the sensor, the processor unit being configured to:
        receive the distance information from the sensor;
        transform the distance information from a sensor coordinate system to a material handling vehicle coordinate system;
        perform pattern recognition on the transformed distance information to identify the aisle feature within the aisle;
        create an aisle model based on a projection of the identified aisle feature, the aisle model including a virtual representation of the projected aisle feature, the virtual representation of the projected aisle feature being generated based on the distance information from the sensor;
        based on the aisle model, predict a location of the aisle feature beyond the field of view of the sensor; and
        based on the predicted location of the aisle feature, control a steering angle of the material handling vehicle as the material handling moves along an aisle.

2. The guidance system of claim 1, wherein:
the steering angle of the material handling vehicle is controlled based on a distance between the material handling vehicle and the predicted location of the aisle feature.

3. The guidance system of claim 2, wherein adjustment of the steering angle is configured to align the material handling vehicle with a desired path through the aisle.

4. The guidance system of claim 1, wherein:
the sensor is coupled with the material handling vehicle; and
the processor unit is in communication with the material handling vehicle.

5. The guidance system of claim 1, wherein the sensor is at least one of a LiDAR sensor or an image sensor.

6. A material handling vehicle, comprising:
a vehicle management system configured to control movement of the material handling vehicle within an aisle, the vehicle management system including;
a sensor configured to:
  measure a plurality of distances, wherein each distance is a distance to one of a plurality of external objects within a field of view of the sensor, the external objects being one or more aisle features within an aisle, the aisle formed by spaced structural features and forming a passage for the material handling vehicle, wherein the one or more aisle features are static; and
  output a distance information corresponding to the plurality of measured distances; and
a processor unit in communication with the sensor the processor unit being configured to:
  receive the distance information from the sensor;
  transform the distance information from a sensor coordinate system to a material handling vehicle coordinate system;
  identify an aisle feature of the one or more aisle features based on the transformed distance information;
  create an aisle model based on a projection of the identified aisle feature, the aisle model including a virtual representation of the projected aisle feature, the virtual representation of the projected aisle feature being generated based on the distance information from the sensor;
  based on the aisle model, predict a location of the aisle feature beyond the field of view of the sensor; and
  based on the predicted location of the aisle feature, control a steering angle of the material handling vehicle as the material handling moves along the aisle.

7. The material handling vehicle of claim 6, wherein:
the steering angle of the material handling vehicle is controlled based on a distance between the material handling vehicle and the predicted location of the aisle feature.

8. The material handling vehicle of claim 6, wherein the aisle feature is a crossbeam.

9. The material handling vehicle of claim 6, wherein the processor unit is configured to:
receive a second distance information from the sensor corresponding to a second plurality of measured distances to the plurality of external objects;
transform a subset of the second distance information from the sensor coordinate system to the material handling vehicle coordinate system, wherein the subset of the second distance information corresponds to an expected location of the identified aisle feature;
reidentify the aisle feature based on the transformed second distance information;
update the aisle model based on the reidentified aisle feature; and
based on the updated aisle model, control a steering angle of the material handling vehicle as the material handling moves along the aisle.

10. A method of guiding a material handling vehicle along an aisle, the method comprising:
measuring, with a sensor, a plurality of distances, wherein each distance is a distance to one of a plurality of external objects within a field of view of the sensor, the external objects being one or more aisle features within an aisle, the aisle formed by spaced structural features and forming a passage for the material handling vehicle, wherein the one or more aisle features are static;
transforming, using a processor unit in communication with the sensor, the plurality of distance measurements from a sensor coordinate system to a material handling vehicle coordinate system;
performing, using the processor unit, pattern recognition on the plurality of transformed distance measurements to identify an aisle feature of the one or more aisle features within the aisle;
creating, using the processor unit, an aisle model based on a projection of the identified aisle feature, the aisle model including a virtual representation of the projected aisle feature, the virtual representation of the projected aisle feature being generated based on the distance information from the sensor;
based on the aisle model, predicting a location of the aisle feature beyond the field of view of the sensor; and
based on the predicted location of the aisle feature, controlling a steering angle of the material handling vehicle as the material handling moves along the aisle.

11. The method of claim 10, wherein:
the steering angle of the material handling vehicle is controlled based on a distance between the material handling vehicle and the predicted location of the aisle feature.

12. The method of claim 11, wherein adjustment of the steering angle is configured to align the material handling vehicle with a desired path through the aisle.

13. The method of claim 12, further comprising:
identifying a first aisle feature on a first side of the aisle and identifying a second aisle feature on a second side of the aisle; and
controlling a steering angle of the material handling vehicle to center the material handling vehicle between the first side of the aisle and the second side of the aisle.

14. The method of claim 10, further comprising:
measuring, with the sensor, a second plurality of distances to the external objects;
transforming, using the processor unit, a subset of the second plurality of distance measurements from the sensor coordinate system to the material handling vehicle coordinate system, wherein the subset of the second plurality of distance measurements corresponds to an expected location of the identified aisle feature;
performing, using the processor unit, pattern recognition on the transformed subset of second distance measurements to reidentify the aisle feature;
updating, using the processor unit, the aisle model based on the reidentified aisle feature; and based on the updated aisle model, controlling a steering angle of the material handling vehicle as the material handling moves along the aisle.

15. The method of claim 10, wherein the aisle feature is a crossbeam.

\* \* \* \* \*